United States Patent

[11] 3,573,591

| [72] | Inventor | Quentin C. Turtle |
| --- | --- | --- |
| | | Cranston, R.I. |
| [21] | Appl. No. | 848,660 |
| [22] | Filed | Aug. 8, 1969 |
| [45] | Patented | Apr. 6, 1971 |
| [73] | Assignee | General Signal Corporation |

[54] PROPORTIONAL SPEED FLOATING CONTROLLER
6 Claims, 2 Drawing Figs.

| [52] | U.S. Cl. | 318/681, 318/618, 318/326 |
| --- | --- | --- |
| [51] | Int. Cl. | G05f 1/08 |
| [50] | Field of Search | 318/20.835, 20.390, 20.395, 20.280, 20.427, 326, 310, 20.426, 20.420 |

[56] References Cited
UNITED STATES PATENTS

| 3,015,767 | 1/1962 | Taylor | 318/28 |
| --- | --- | --- | --- |
| 3,241,015 | 3/1966 | Allen | 318/18 |
| 3,366,856 | 1/1968 | Sawano | 318/448X |
| 3,413,534 | 11/1968 | Stringer | 318/326X |

Primary Examiner—Benjamin Dobeck
Attorney—Dodge and Ostmann

ABSTRACT: Solid-state proportional speed floating controllers employing an integrating amplifier in the feed-forward path and a tachometer generator for producing a velocity feedback signal. The final controlling element is positioned by a DC or universal motor which also drives the tachometer and which is supplied with power through a static switch which is gated by a static trigger. The firing angle of the trigger is controlled by an RC timing circuit that receives line synchronized voltage pulses on which is superimposed the output voltage of the amplifier.

Patented April 6, 1971 3,573,591

INVENTOR
QUENTIN C. TURTLE

BY *Dodge & Ostmann*

ATTORNEYS

PROPORTIONAL SPEED FLOATING CONTROLLER

BACKGROUND AND SUMMARY OF THE INVENTION

U.S. Pat. No. 3,402,338, granted Sept. 17, 1968, discloses a solid-state control circuit for a DC or universal electric motor which employs a static, gate-controlled power switch which is gated by a static trigger whose firing angle is controlled by an RC timing network. This network is supplied continuously with regulated voltage pulses which are in synchronism with the AC power delivered to the power switch, and with a variable DC control voltage. The control voltage is superimposed on the voltage pulses and has the effect of changing the firing angle of the static trigger an amount dependent upon its magnitude. Since the length of the portion of each half cycle during which the power switch conducts varies with the firing angle of the trigger, the power received by the motor, and consequently the motor speed, is dependent upon the magnitude of the control signal.

This control circuit has been incorporated in proportional speed floating controllers wherein the motor positions the final controlling element, and the control voltage is an amplified actuating error signal representative of the algebraic sum of reference input and feedback signals. In particular, I have reference to controllers for water filtration plants in which the final controlling element is a butterfly valve which serves to regulate the flow rate of the water. Experience with this application of the controller indicates that valve friction varies over a rather wide range and that, as a result, actuating error signals of considerable magnitude sometimes are required in order for the motor to move the valve. The practical effect of this can be an intolerably large deadband for the controller, i.e., corrective action is delayed until flow rate deviates substantially from the set point. It was thought that this condition might be eliminated by providing an integrating type of amplifier since this measure would be effective to raise the output of the amplifier in those cases where persistent small errors were encountered. However, tests showed that this change produced hunting and made the controller unstable. Although the frequency of the sustained oscillations which were produced can be reduced by using an integrating network having a large time constant, that approach inherently increases the size of the deadband and thus is unacceptable.

Another disadvantage of the aforementioned controller is the fact that its modulation band, i.e., the range of values of the input signal for which there are corresponding motor speeds, can be varied only by changing the gain of the amplifier. This is undesirable because deadband also is dependent upon gain and thus is altered whenever the width of the modulation band is changed.

The object of this invention is to provide an improved version of the proportional speed floating controller described above which is free of the disadvantages which have been noted. According to the invention, the amplifier for the actuating error signal is provided with an integrating network, and the adverse effects of this component on stability which were encountered in the prior controller are avoided by inclusion of a tachometer generator which introduces into the signal-summing circuit a second feedback signal which varies with motor speed and direction of movement and which acts in opposition to the set point or reference signal. The provision of velocity feedback not only insures stability in the presence of the integrating network, and thus makes possible the use of this network to compensate for variations in valve friction, but also results in a more linear relationship between valve speed and error signal and makes possible independent control of the modulation band. Furthermore, since the time constant of the integrating network now need not be particularly large, the invention minimizes the adverse effects of temperature changes on the electronic components.

BRIEF DESCRIPTION OF THE DRAWINGS

Several embodiments of the invention are described herein with reference to the accompanying drawing in which.

DESCRIPTION OF THE FIG. 1 EMBODIMENT

Figure 1:
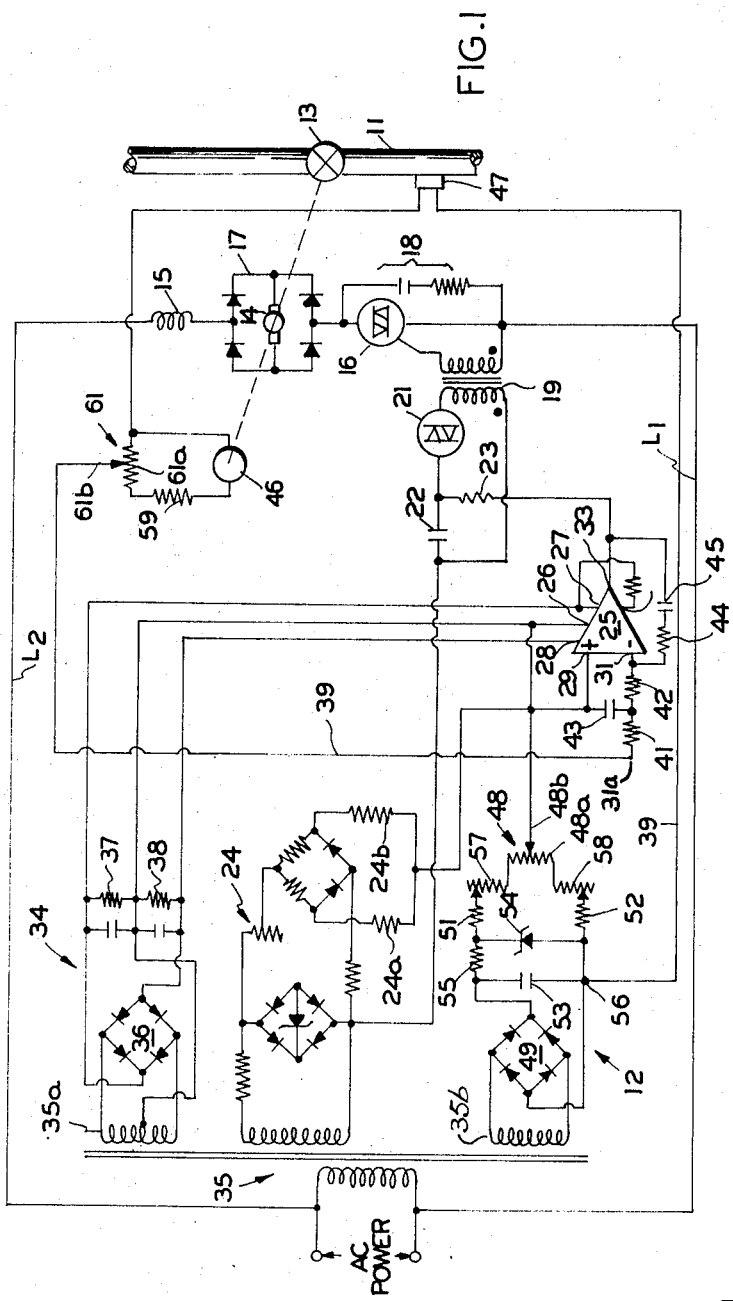
FIG. 1 is a circuit diagram of one form of the improved controller.

As shown in FIG. 1, the improved controller is employed to maintain correspondence between the actual rate of flow of water through a pipe 11 and a desired rate of flow as represented by the output of a set point signal generator 12. The flow rate in pipe 11 is regulated by a butterfly valve 13 which is positioned by a series motor whose armature 14 and field 15 are connected in an AC power circuit including leads $L_1$ and $L_2$ and Triac 16. One winding of the motor, in this case armature 14, is connected across the output junctions of a bridge rectifier 17 in order to make possible reverse operation of the motor. Although not illustrated, bridge 17 incorporates limit switches which open the power circuit through the motor either when valve 13 reaches the fully open and closed positions, respectively, or when the torque required to move the valve becomes excessive. In some cases, both position-responsive and torque-responsive switches are used. Valve-operating motor 14, 15 has relatively high inductance which could prevent the fast-acting Triac 16 from performing its intended control function. In order to guard against this, and also to filter some of the motor noise, the AC power circuit is equipped with an RC couple 18.

The Triac power switch 16 is gated through a pulse transformer 19 by a diac 21 which is fired in opposite directions by pulses supplied from an RC timing network including capacitor 22 and resistor 23. This network, in turn, receives line-synchronized voltage pulses from a generator 24. The output of the generator is in the form of a clipped sine wave which, at least nominally, is symmetrical about the zero voltage axis and has an amplitude which is either insufficient to enable timing network 22, 23 to fire diac 21 or which causes network 22, 23 to fire the diac very late in each half cycle. Generator 24 is fully described in U.S. Pat. No. 3,402,338 mentioned earlier, but it should be observed that it incorporates a pair of fixed voltage-dividing resistors 24a and 24b in lieu of the balancing potentiometer employed in the patent because the present controller includes feedback and thus inherently compensates for inequalities in the amplitudes of the positive and negative portions of the clipped sine wave.

The speed and direction of operation of motor 14, 15 are controlled by a variable DC voltage which is superimposed on the output of generator 24 by amplifying means including operational amplifier 25. The operational amplifier, which may be a Nexus SQ10a Amplifier marketed by Philbrick/Nexus Research, a Teledyne Company, of Dedham, Mass., includes a common connection 26, power connections 27 and 28, positive and negative input connections 29 and 31, respectively, a trim connection 32 and an output connection 33. Power is delivered to the connections 27 and 28 from an amplifier power supply 34 comprising one of the secondary windings 35a of transformer 35, rectifier bridge 36, and a pair of filters 37 and 38. The positive input connection 29 is coupled directly to common connection 26, but the negative input connection 31 is joined through input resistors 41 and 42 to a summing network 39 in which is developed the actuating error signal of the controller. Noise in the input circuit of amplifier 25 is filtered by a network consisting of the resistors 41 and 42 and a capacitor 43. The amplifying means also includes a feedback patch containing the series-connected resistor 44 and capacitor 45, and the ratio of the sum of the impedances of these elements to the sum of the impedances or resistors 41 and 42 establishes the gain of operational amplifier 25. Elements 44 and 45 also define an integrating network, so the time rate of change of the amplifier output voltage at connection 33 is dependent upon the magnitude of the error signal applied to the input 31a of the amplifying means. In other words, the amplifying means has an output composed of one component equal to the product of the error signal and the gain, and a second component which is a time integral of the error.

The summing network 39 of the controller connects in series, and thus algebraically adds the DC outputs of, set point signal generator 12, tachometer generator 46, and flow rate signal generator 47. Signal generator 12 comprises a set point potentiometer 48 whose element 48a is connected with the output junctions of a bridge rectifier 49 through a pair of voltage-dropping resistors 51 and 52 and a pair of calibration potentiometers 57 and 58. The bridge is energized from a secondary 35b of transformer 35, and its DC output is smoothed by capacitor 53 and regulated by Zener diode 54. A resistor 55 limits the current drawn by the diode. The wiper 48b of potentiometer 48 is grounded to the common connection 26 of amplifier 25, so the output voltage of generator 12 is taken from a point 56 to the left of resistor 52. The calibration potentiometers 57 and 58 are included in generator 12 in order to permit the maximum and minimum values of its output voltage to be matched to the corresponding values of the output of the flow rate signal generator 47.

Tachometer generator 46 is driven by valve-actuating motor 14, 15 and introduces into summing network 39 a velocity feedback signal which is proportional to the speed of movement of valve 13 and opposes the output of generator 12. The DC output voltage of generator 46 is reduced by resistor 59 and is applied across the element 61a of a potentiometer 61. The rate of change of the velocity feedback signal with speed depends upon the position of the wiper 61b of potentiometer 61, and therefore, the potentiometer serves as a convenient and effective means for varying the modulation band of the controller.

The third signal generator 47 in summing network 39 is adapted to produce a DC feedback voltage which is proportional to the rate of flow through pipe 11 and which has a polarity opposite to that of the output of generator 12. A suitable flow rate signal generator is the Model 251–03 Transmitter which is marketed by the B. I. F. Unit of General Signal Corporation and is used in combination with a flow meter, such as a venturi, of the differential pressure-producing type.

When the FIG. 1 controller is in use and the rate of flow through pipe 11 is at the desired value, the output of the feedback generator 47 will balance the output of set point generator 12, and no error signal will be applied to the input 31a of the amplifying means. Under this condition, timing network 22,23 will receive only the symmetrical output wave of generator 24. During each half cycle of the AC power, capacitor 22 will be charged in one direction or the other, but the voltage across the capacitor either will not reach the breakover voltage of diac 21 or will rise to that value very late in the half cycle. Therefore, triac 16 either will not fire, and motor 14,15 will remain at rest, or the triac will conduct for a short time at the end of each half cycle and cause the motor to dither, i.e., tend to rotate in opposite directions on successive positive and negative half cycles. The present controller does not rely upon dithering to reduce deadband, so it is preferred that the diac and triac remain nonconductive under null conditions. In any event, when the error signal is zero, the position of valve 13 will remain unchanged, and the output of tachometer generator 46 will be zero.

If the wiper 48b of potentiometer 48 is now moved to raise the set point, or if external conditions cause a decrease in the rate of flow through pipe 11, the outputs of generators 12 and 47 will become unbalanced, and network 39 will supply a positive error signal to amplifier input 31a. This causes the voltage at output connection 33 to increase relatively to the voltage at common connection 26 and has the effect of shifting the output wave of generator 24 in a sense that increases and decreases, respectively, the amplitudes of the positive and negative pulses supplied to timing network 22,23. Now, on each half cycle in which lead $L_2$ is positive with respect to lead $L_1$, capacitor 22 will be charged to the breakover voltage of diac 21 at a point in the half cycle corresponding to the output of the amplifier, and the diac will supply a positive pulse to the gate of triac 16 through the pulse transformer 19. As a result, the triac will be rendered conductive in the direction of lead $L_1$, and current will flow through the windings of motor 14,15. On the negative half cycles, the negative pulses delivered to the timing network will not charge capacitor 22 to the breakover voltage of diac 21, so triac 16 will be nonconductive. Since motor 14,15 now receives power only on the positive half cycles, and the length of that portion of each of those half cycles during which it receives power increases as the error signal develops, the motor will accelerate and move butterfly valve 13 in the opening direction. As this movement proceeds, tachometer generator 46 will introduce into summing network 39 a feedback voltage which increases with the speed of the motor. Therefore, when the speed of movement of valve 13 corresponds to the magnitude of the error signal, the output of amplifier 25 will have stabilized, and the acceleration of the motor and valve will have decreased to zero.

As valve 13 opens during the operation just described, the rate of flow through pipe 11, and consequently the output of generator 47, will begin to increase. The change in the feedback voltage supplied by generator 47 reduces the magnitude of the error signal which network 39 supplies to the input 31a of the amplifying means, and thus decreases the degree of asymmetry of the clipped sine wave furnished to timing network 22,23. This action has the effect of shortening that portion of each positive half cycle during which triac 16 is conductive and thereby reducing the speed of motor 14,15. Therefore, since the output voltage of tachometer generator 46 decreases with motor speed, it will be evident that the speed of movement of valve 13 will decrease to zero as correspondence between the actual and the desired flow rates is reestablished.

In cases where potentiometer 48 is adjusted to reduce the set point, or external conditions produce an increase in the rate of flow through pipe 11, the controller operates in the same way, except that amplifier input 31a is supplied with a negative error signal, diac 21 and triac 16 are rendered conductive on the negative rather than the positive half cycles of the AC power, and motor 14,15 rotates in a direction that effects closure of valve 13.

As mentioned earlier, integrating network 44,45 is included in the controller in order to reduce deadband in those situations wherein the friction of valve 13 varies between wide limits. The network does this by insuring that persistent small error signals will, in time, develop an amplifier output voltage sufficient to cause the diac-triac circuit to supply motor 14,15 with the power needed to move valve 13. Normally, this integrating action would also produce a "coasting" that results in intolerable oscillations of the controller. However, the use of velocity feedback in the present controller eliminates this drawback because it insures proportionality between valve speed and the magnitude of the error signal.

DESCRIPTION OF THE FIG. 2 EMBODIMENT

Although the controller shown in FIG. 1 has proven satisfactory, the preferred controller incorporates the teachings of copending Ser. No. 666,447, filed Sept. 8, 1967, (now Pat. No. 3,523,234, dated Aug. 4, 1970) and uses the integrated circuit 62 illustrated in FIG. 2 to perform the functions of pulse generator 24 and amplifier power supply 34. As explained in that application, this arrangement is more economical and affords better voltage regulation than its FIG. 1 counterpart.

Figure 2:
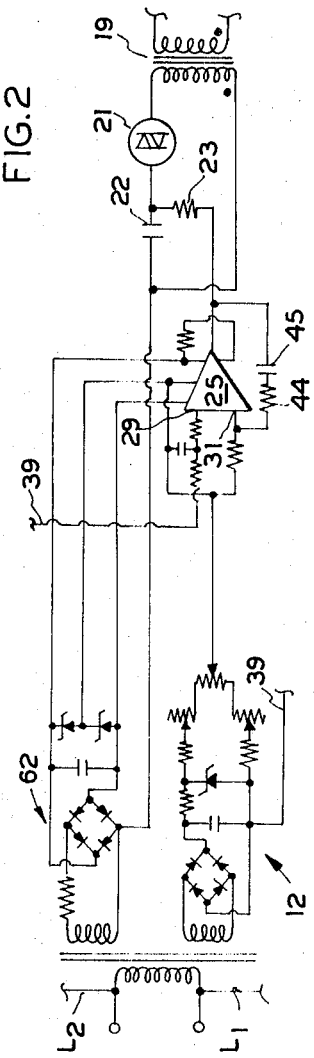
FIG. 2 is a circuit diagram showing the preferred pulse generator, amplifier power supply and voltage regulator for the FIG. 1 controller.

It also should be noted that, in the FIG. 2 controller, the actuating error signal is introduced into the positive rather than the negative input channel of the operational amplifier. While either scheme is acceptable, the FIG. 2 design is preferred because the positive input channel has the higher impedance, and this tends to improve the linearity of the controller.

I claim:

1. In a proportional speed floating controller including:

a. a final controlling element (13) for varying a directly controlled variable;
b. an electric motor (14,15) for positioning the final controlling element;
c. reference-input and feedback signal-generating means (12 and 47) for supplying signals indicative, respectively, of the desired and actual values of the directly controlled variable;
d. summation means (39) for algebraically combining said signals to produce an actuating error signal; and
e. control means (16—19, 21—25) for the motor which responds to the magnitude and sense of the actuating error signal and which includes amplifying means for said signal;

the improvement which comprises:
1. an integrating network (44,45) associated with the amplifying means and serving to make the time rate of change of its output dependent upon its input; and
2. a velocity signal generator (46,59,61) driven by the motor and connected to supply to the summation means a signal which varies with the velocity of the motor and which opposes the reference-input signal.

2. An improved controller as defined in claim 1 in which the velocity signal generator (46,59,61) produces a signal which is proportional to motor velocity and includes a means (61) for varying the factor of proportionality.

3. An improved controller as defined in claim 2 in which:
a. the amplifying means includes an operational amplifier (25); and
b. the integrating network comprises a feedback path interconnecting the output and negative input connections (33 and 31) of the amplifier (25) and containing a resistor (44) and a capacitor (45) arranged in series.

4. In a proportional speed floating controller including:
a. a final controlling element (13) for varying a directly controlled variable;
b. a DC or universal electric motor (14,15) for positioning the final controlling element and which is connected with an AC power source through static, gate-controlled power-switching means (16);
c. static triggering means (21) for gating said switching means and associated with a timing network (22,23) which controls its firing angle;
d. means (24) for supplying to said timing network voltage pulses of regulated magnitude which are in synchronism with the AC power;
e. means (12 and 47) for producing DC reference and feedback voltages indicative, respectively, of desired and actual values of said variable;
f. summing means (39) for algebraically combining the reference and feedback voltages and producing an actuating error signal; and
g. amplifying means connected to receive the error signal and supply to the timing network a DC control voltage which varies with the error signal;

the improvement which comprises:
1. an integrating network (44,45) associated with the amplifying means for making the time rate of change of its output dependent upon its input; and
2. a velocity signal generator (46,59,61) driven by the motor and connected to supply to the summing means a second DC feedback voltage which varies in polarity and magnitude with the direction of movement and speed of the motor and which acts in opposition to said reference voltage.

5. An improved controller as defined in claim 4 in which the velocity signal generator (46,59,61) produces a signal which is proportional to motor velocity and includes means (61) for varying the factor of proportionality.

6. An improved controller as defined in claim 4 in which:
a. the amplifying means includes an operational amplifier (25); and
b. the integrating network comprises a feedback path interconnecting the output and negative input connections (33 and 31) of the amplifier (25) and containing a resistor (44) and a capacitor (45) arranged in series.